United States Patent
Haynes et al.

(10) Patent No.: US 12,122,524 B2
(45) Date of Patent: Oct. 22, 2024

(54) READINESS INDICATOR LIGHTS FOR EVACUATION SLIDE

(71) Applicant: GOODRICH CORPORATION, Charlotte, NC (US)

(72) Inventors: Timothy C Haynes, Prescott Valley, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/354,549

(22) Filed: Jul. 18, 2023

(65) Prior Publication Data

US 2023/0356848 A1 Nov. 9, 2023

Related U.S. Application Data

(62) Division of application No. 16/746,094, filed on Jan. 17, 2020, now Pat. No. 11,745,880.

(51) Int. Cl.
*B64D 25/14* (2006.01)
*B64D 47/02* (2006.01)
*G08B 5/36* (2006.01)
*H05B 45/22* (2020.01)
*H05B 45/30* (2020.01)

(52) U.S. Cl.
CPC .............. *B64D 25/14* (2013.01); *G08B 5/36* (2013.01); *H05B 45/22* (2020.01); *H05B 45/30* (2020.01)

(58) Field of Classification Search
CPC ........ H05B 45/20; H05B 45/30; H05B 45/22; H05B 47/10; H05B 47/115; H05B 47/17; B64D 25/14; B64D 45/00; B64D 47/02; B64D 2203/00; G08B 5/36; G08B 7/066; G08B 5/18
See application file for complete search history.

(56) References Cited

U.S. PATENT DOCUMENTS

| | | | |
|---|---|---|---|
| 4,333,546 A | 6/1982 | Fisher | |
| 6,443,259 B1 | 9/2002 | Oney et al. | |
| 8,121,438 B2 | 2/2012 | Farmer et al. | |
| 8,952,828 B2 | 2/2015 | Kohlmeier-Beckmann et al. | |
| 9,309,002 B2 | 4/2016 | Fellmann et al. | |
| 9,701,411 B2 | 7/2017 | Kohlmeier-Beckmann et al. | |
| 9,751,635 B2* | 9/2017 | Heuer ................... | B64D 45/00 |
| 9,789,970 B2 | 10/2017 | Giesa et al. | |

(Continued)

OTHER PUBLICATIONS

USPTO; Requirement for Restriction dated Apr. 20, 2022 in U.S. Appl. No. 16/746,094.

(Continued)

*Primary Examiner* — Thai Pham
(74) *Attorney, Agent, or Firm* — SNELL & WILMER L.L.P.

(57) ABSTRACT

A light system for an evacuation slide may include a readiness indicator light assembly. The readiness indicator light assembly may comprise a first light emitting diode configured to emit a first color and a second light emitting diode configured to emit a second color. The light system may be configured to power the first light emitting diode after initial deployment of the evacuation slide and to power the second light emitting diode after the internal pressure of the evacuation slide is greater than a minimum pressure threshold.

9 Claims, 7 Drawing Sheets

(56) References Cited

U.S. PATENT DOCUMENTS

| | | |
|---|---|---|
| 9,870,691 B2 | 1/2018 | Bredemeier et al. |
| 10,322,812 B2 | 6/2019 | Knijnenburg et al. |
| 10,351,251 B2 | 7/2019 | Haynes et al. |
| 2008/0284619 A1* | 11/2008 | Farmer ................ B64C 1/1407 340/963 |
| 2011/0139934 A1* | 6/2011 | Giesa .................... B64D 25/14 244/137.2 |
| 2015/0091472 A1 | 4/2015 | Kadotani et al. |
| 2015/0097083 A1* | 4/2015 | Fellmann ................ B64D 9/00 244/137.2 |
| 2017/0303363 A1 | 10/2017 | Pyshos et al. |
| 2019/0150248 A1 | 5/2019 | Leegate et al. |
| 2019/0291880 A1 | 9/2019 | McBurnett et al. |

OTHER PUBLICATIONS

USPTO; Non-Final Office Action dated Oct. 27, 2022 in U.S. Appl. No. 16/746,094.

USPTO; Ex-Parte Quayle Office Action dated Feb. 24, 2023 in U.S. Appl. No. 16/746,094.

USPTO; Notice of Allowance dated Apr. 24, 2023 in U.S. Appl. No. 16/746,094.

\* cited by examiner

READINESS INDICATOR LIGHTS FOR EVACUATION SLIDE

CROSS-REFERENCE TO RELATED APPLICATIONS

This application is a divisional of, and claims priority to, U.S. patent application Ser. No. 16/746,094, filed Jan. 17, 2020 titled "READINESS INDICATOR LIGHTS FOR EVACUATION SLIDE," which is incorporated by reference herein in its entirety for all purposes.

FIELD

The present disclosure relates to aircraft evacuation systems and, in particular, to readiness indicator lights for an evacuation slide.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Evacuation systems may include a readiness indicator, which indicates to evacuees whether the slide is fully deployed and/or in a position to safely covey evacuees to an exit surface. Current readiness indicators may inflate during slide inflation. However, the indicators can be difficult to see and/or understand, and may be ineffective in high winds.

SUMMARY

A light system for an evacuation slide is disclosed herein. In accordance with various embodiments, the light system may comprise a first readiness indicator light assembly including a first light emitting diode and a second light emitting diode. The first light emitting diode may emit a first color and the second light emitting diode may emit a second color. The second color may be different from the first color. A first circuit may be electrically coupled to the first light emitting diode. A second circuit may be electrically coupled to the second light emitting diode.

In various embodiments, the first circuit may be configured to close in response to an initial deployment of the evacuation slide. The second circuit may be configured to remain in an open state during the initial deployment. In various embodiments, the second circuit may be configured to close in response to an internal pressure within the evacuation slide exceeding a predetermined minimum pressure.

In various embodiments, a first plug may be operationally coupled to the first circuit. The first plug may be configured to maintain the first circuit in the open state. A second plug may be operationally coupled to the second circuit. The second plug may be configured to maintain the second circuit in the open state.

In various embodiments, a first actuator may be coupled to the first plug, and a second actuator may be coupled to the second plug. In various embodiments, the first actuator may be configured to translate the first plug in response to the initial deployment of the evacuation slide and the second actuator may be configured to translate the second plug in response to the internal pressure within the evacuation slide exceeding the predetermined minimum pressure.

In various embodiments, a second readiness indicator light assembly may be downstream of the first readiness indicator light assembly. The second readiness indicator light assembly may include a third light emitting diode electrically coupled to the first light emitting diode and a fourth light emitting diode electrically coupled to the second light emitting diode. The third light emitting diode may emit the first color and the fourth light emitting diode may emit the second color.

In various embodiments, a non-indicator light assembly may be electrically coupled to the second readiness indicator light assembly. The non-indicator light assembly may include a fifth light emitting diode.

An evacuation slide is also disclosed herein. In accordance with various embodiments, the evacuation slide may comprise an inflatable rail and a light system. The light system may include a first readiness indicator light assembly coupled the inflatable rail. The first readiness indicator light assembly may include a first light emitting diode and a second light emitting diode. The first light emitting diode may emit a first color and the second light emitting diode may emit a second color. The second color may be different from the first color. A first circuit may be electrically coupled to the first light emitting diode. A second circuit may be electrically coupled to the second light emitting diode.

In various embodiments, the first circuit may be configured to close in response to an initial inflation of the inflatable rail. The second circuit may be configured to remain in an open state prior to an internal pressure within the inflatable rail exceeding a predetermined minimum pressure. The second circuit may be configured to close in response to the internal pressure within the evacuation slide exceeding the predetermined minimum pressure.

In various embodiments, a first plug may be operationally coupled to the first circuit. The first plug may be configured to maintain the first circuit in the open state prior to the initial inflation of the inflatable rail. A second plug may be operationally coupled to the second circuit. The second plug may be configured to maintain the second circuit in the open state prior to the internal pressure within the evacuation slide exceeding the predetermined minimum pressure.

In various embodiments, a first actuator may be coupled to the first plug, and a second actuator may be coupled to the second plug. In various embodiments, the first actuator may be configured to translate the first plug in response to the initial inflation of the inflatable rail, and the second actuator may be configured to translate the second plug in response to the internal pressure within the evacuation slide exceeding the predetermined minimum pressure.

In various embodiments, the second actuator may be coupled to a toe end of the evacuation slide. In various embodiments, the light system may further comprise a second readiness indicator light assembly downstream of the first readiness indicator light assembly. The second readiness indicator light assembly may include a third light emitting diode electrically coupled to the first light emitting diode and a fourth light emitting diode electrically coupled to the second light emitting diode. The third light emitting diode may emit the first color and the fourth light emitting diode may emit the second color different from the first color.

In various embodiments, the light system may further comprise a non-indicator light assembly coupled to the inflatable rail. The non-indicator light assembly may include a third light emitting diode. The non-indicator light assembly may be located closer to a toe end of the evacuation slide, as compared to the first readiness indicator light assembly.

In various embodiments, the third light emitting diode of the non-indicator light assembly may be electrically coupled to the second light emitting diode of the first readiness indicator light assembly.

An evacuation assembly is also disclosed herein. In accordance with various embodiments, the evacuation assembly may comprise an evacuation slide, a lever configured to deploy the evacuation system, and an alert system. The alert system may comprise a light, a speaker, an optical sensor oriented toward the lever and configured to sense objects in a vicinity of the lever, and a controller operably coupled to the light, the speaker, and the optical sensor. The controller may be configured to output commands to the light and the speaker based on signals from received from the optical sensor and based on an inflation status of the evacuation slide.

In various embodiments, the controller may be configured to command the light to output a first color visual alert if an internal pressure of evacuation slide is less than a predetermined minimum pressure and to command the light to output a second color visual alert if the internal pressure of evacuation slide is greater than or equal to the predetermined minimum pressure.

In various embodiments, the controller may be configured to command the speaker to output a first audio alert comprising a first command if an internal pressure of evacuation slide is less than a predetermined minimum pressure and to command the speaker to output a second audio alert comprising a second command different from the first command if the internal pressure of evacuation slide is greater than or equal to the predetermined minimum pressure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity.

Figure 1:
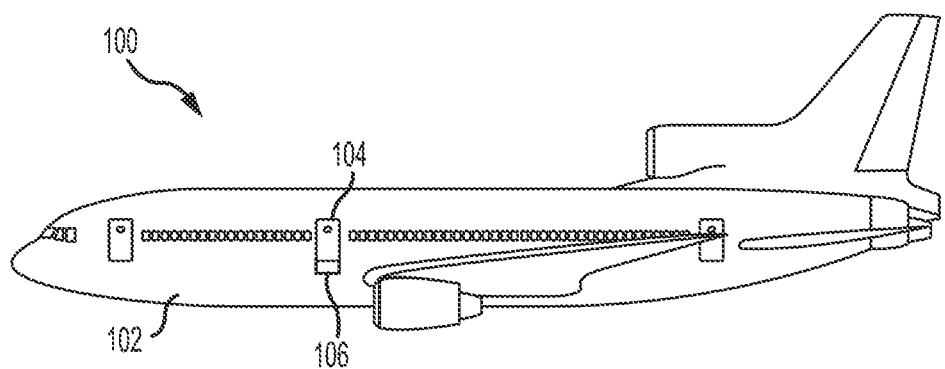
FIG. 1 illustrates an aircraft having an evacuation system, in accordance with various embodiments.

With reference to FIG. 1, an exemplary aircraft 100 is shown, in accordance with various embodiments. Aircraft 100 may comprise a fuselage 102 having plurality of exit doors, including an exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2A:
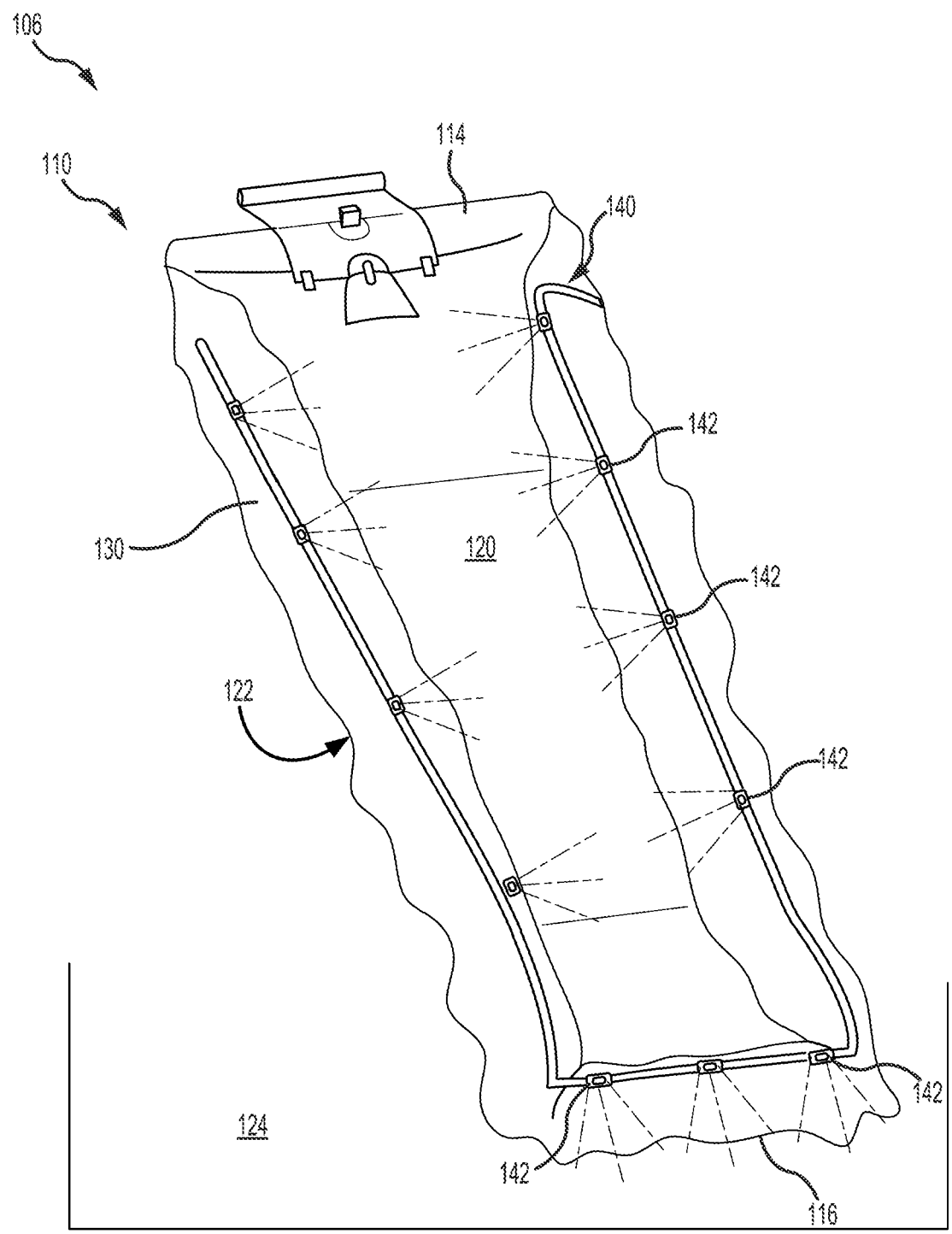
FIG. 2A illustrates an evacuation slide in a partially inflated state, in accordance with various embodiments.

With reference to FIG. 2A, and continuing reference to FIG. 1, an inflatable evacuation slide 110 of evacuation assembly 106 is illustrated in a partially inflated state (also referred to as a partially deployed position). Evacuation slide 110 may deploy from aircraft 100 in response to the opening of exit door 104. In accordance with various embodiments, evacuation slide 110 includes a head end 114 and a toe end 116 opposite head end 114. Head end 114 may be coupled to an aircraft structure (e.g., fuselage 102 in FIG. 1). Evacuation slide 110 includes a sliding surface 120 and an underside surface 122 opposite sliding surface 120. Sliding surface 120 extends from head end 114 to toe end 116. Evacuation slide 110 includes an inflatable rail structure 130 extending between head end 114 and toe end 116 and which may define, at least, a portion of sliding surface 120. In response to an evacuation event (i.e., to deployment of evacuation slide 110), underside surface 122 may be oriented toward an exit surface 124 (e.g., toward the ground or toward a body of water). While evacuation slide 110 is illustrated as a single lane slide, it is contemplated and understood that evacuation slide 110 may include any number of lanes and/or in various embodiments, evacuation slide 110 may include an off-wing evacuation slide (i.e., an evacuation slide that deploys over the wing of an aircraft).

In accordance with various embodiments, evacuation slide 110 includes a light system 140. Light system 140 includes a plurality of lights 142. In various embodiments, each light 142 includes one or more light emitting diodes (LEDs). Lights 142 may be located along inflatable rail structure 130 and toe end 116. The lights 142 located longitudinally along inflatable rail structure 130 may be oriented toward sliding surface 120. The lights 142 located along toe end 116 may be oriented away from sliding surface 120 and toward exit surface 124. In this regard, lights 142 may be configured to illuminate sliding surface 120 and to illuminate exit surface 124 proximate toe end 116.

Figure 2B:
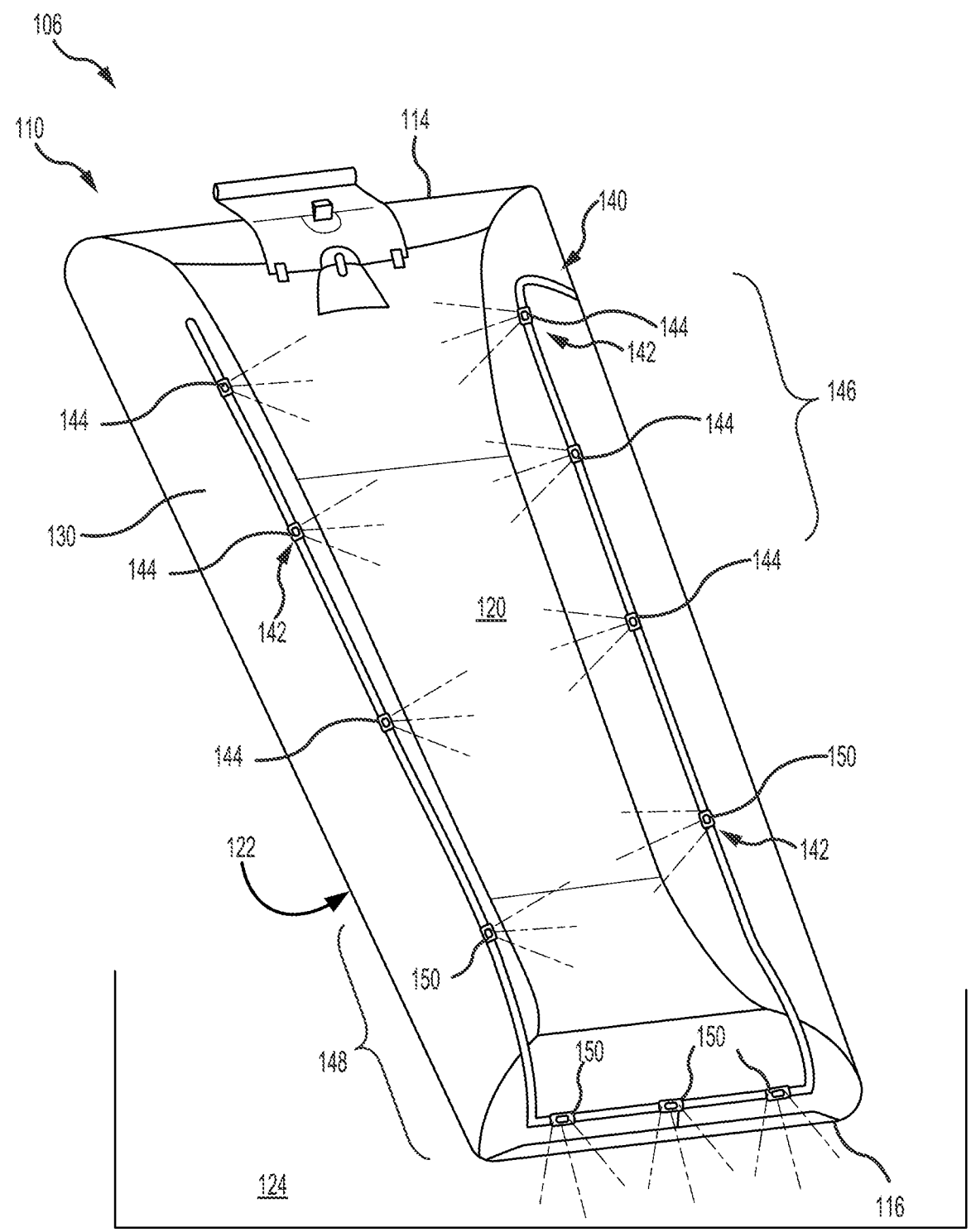
FIG. 2B illustrates an evacuation slide in a fully inflated state, in accordance with various embodiments.

With reference to FIG. 2B, inflatable evacuation slide 110 of evacuation assembly 106 is illustrated in a fully inflated state (also referred to as a fully deployed position). It may be desirable for evacuation slide 110 to have sufficient rigidity or beam strength, when in the fully inflated state, for evacuees to jump onto the sliding surface 120 of evacuation slide 110 and slide down to exit surface 124. In the fully inflated state, inflatable rail structure 130 may be inflated to at least a minimum pressure to provide sufficient beam strength to operate as a slide. For example, a pressure of 3.0 psi (20.7 kPA) may be a minimum pressure desired within inflatable rail structure 130 to achieve a desired beam strength. In accordance with various embodiments, light system 140 may include one or more readiness indicator light assemblies 144. Stated differently, one or more of lights 142 may be configured as a readiness indicator light assembly 144. In accordance with various embodiments, the readiness indicator light assemblies 144 may each include a first light or first LED configured to emit a first color and a second light or second LED configured to emit a second color different from the first color. For example, in various embodiments, each readiness indicator light assembly 144 may include a green LED and a red LED. In various embodiments, each readiness indicator light assembly 144 may include a white LED and a red LED. In various embodiments, lights 142 may include a first group 146 of readiness indicator light assemblies 144 and a second group 148 of non-indicator light assemblies 150. Non-indicator light assemblies 150 may be configured to emit a single color. For example, in various embodiments, non-indicator light assemblies 150 may each include one or more white LEDs. In various embodiments, the readiness indicator light assemblies 144 are located closer to head end 114, as compared to the non-indicator light assemblies 150. In this regard, non-indicator light assemblies 150 may be located closer to toe end 116, as compared to readiness indicator light assemblies 144. In various embodiments, all of the lights 142 of light system 140 may be readiness indicator light assemblies 144.

As described in further detail below, light system 140 is configured to turn on (i.e., illuminate) readiness indicator light assemblies 144 and non-indicator light assemblies 150 in response to deployment of evacuation slide 110, and to cause the color of readiness indicator light assemblies 144 to change in response to evacuation slide 110 fully inflating. In this regard, light system 140 is configured to illuminate a first light of readiness indicator light assemblies 144 after deployment evacuation slide 110, but prior to evacuation slide 110 inflating to the desired minimum pressure, and to illuminate a second light of readiness indicator light assemblies 144 in response to the pressure within evacuation slide 110 exceeding the desired minimum pressure. Stated differently, readiness indicator light assemblies 144 emit a first color (e.g., red) when evacuation slide 110 is partially inflated and emit a second color (e.g., green) when evacuation slide 110 is fully inflated. The change in color of readiness indicator light assemblies 144 can indicate to evacuees that evacuation slide 110 is fully inflated and that it is safe to enter sliding surface 120. Non-indicator light assemblies 150 may be turned on (i.e., illuminated) at any time during slide deployment. For example, non-indicator light assemblies 150 may be illuminated upon initial deployment or after the pressure within evacuation slide 110 exceeds the desired minimum pressure.

Figure 3A:
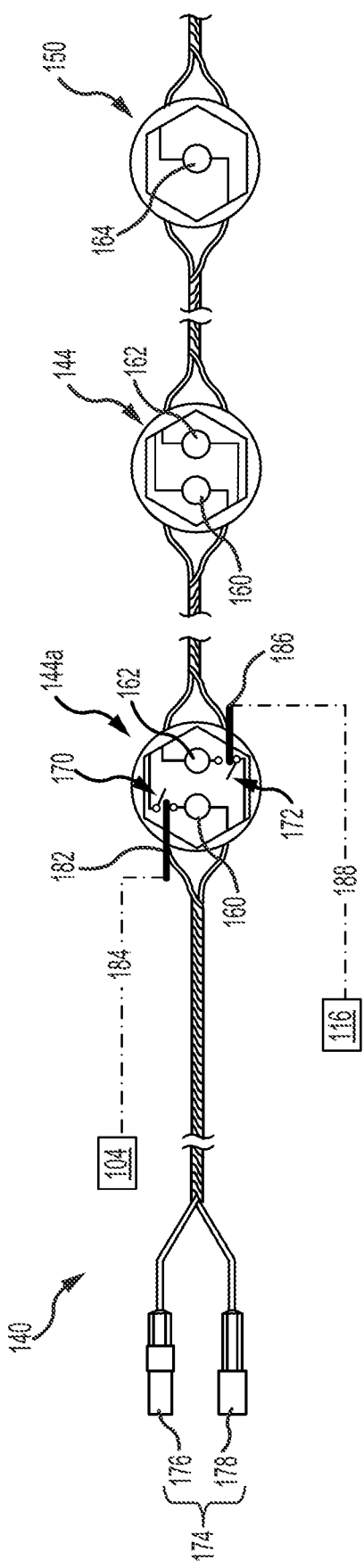
FIG. 3A illustrates a portion of a readiness indicator light system prior to deployment of the evacuation slide, in accordance with various embodiments.
Figure 3B:
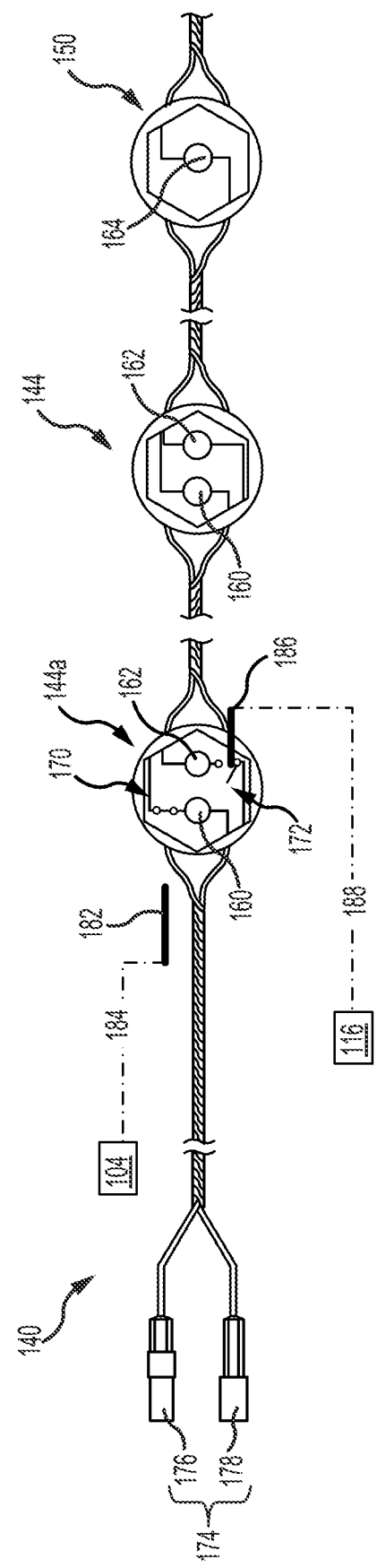
FIG. 3B illustrates a portion of a readiness indicator light system after initial deployment and prior to full inflation of the evacuation slide, in accordance with various embodiments.
Figure 3C:
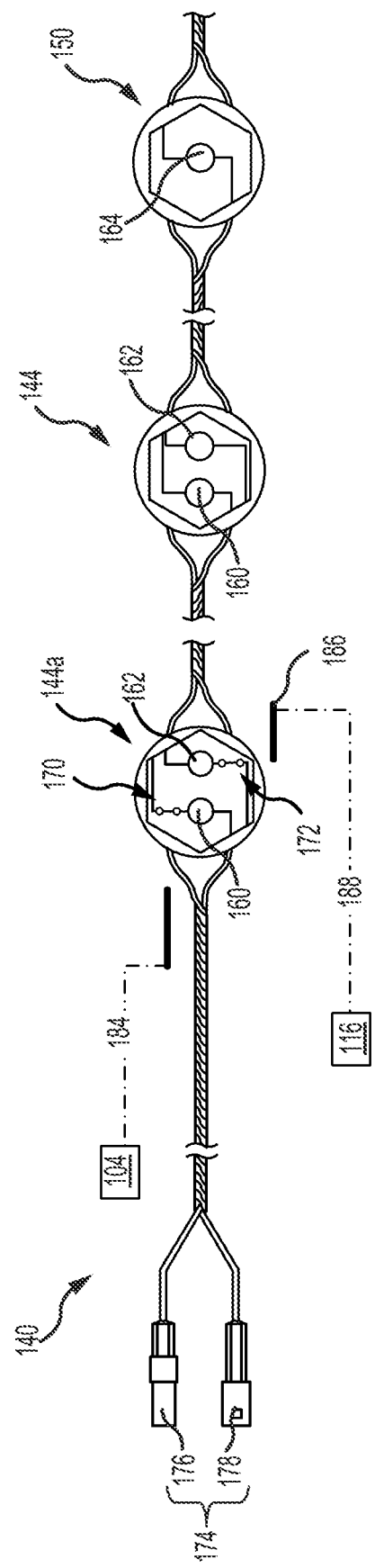
FIG. 3C illustrates a portion of a readiness indicator light system after full inflation of the evacuation slide, in accordance with various embodiments.

With reference to FIGS. 3A, 3B, 3C, and continued reference to FIG. 2B, a portion of light system 140 is illustrated. FIG. 3A illustrates light system 140 prior to deployment of evacuation slide 110. FIG. 3B illustrates light system 140 after deployment of evacuation slide 110, but prior to a pressure within evacuation slide 110 exceeding the minimum desired pressure. FIG. 3C illustrates light system 140 after the pressure within evacuation slide 110 exceeds the minimum desired pressure.

In accordance with various embodiments, the readiness indicator light assemblies of light system 140 (e.g., initial readiness indicator light assembly 144a and readiness indicator light assembly 144) each include a LED 160 and a LED 162. The color emitted from LED 160 is different from the color emitted from LED 162. In accordance with various embodiments, the non-indicator light assemblies 150 of light system 140 each include a LED 164. In various embodiments, the color emitted from LED 164 may be white. In various embodiments, the color emitted from LED 164 may be the same as the color emitted from LED 162. LED 160 of an initial readiness indicator light assembly 144a of light system 140 may be electrically coupled to a first circuit 170. LED 162 of initial readiness indicator light assembly 144a may be electrically coupled to a second circuit 172. First circuit 170 may be located between LED 160 and a power supply 174 of light system 140. Second circuit 172 may be located between LED 162 and power supply 174. In various embodiments, power supply 174 includes a first battery 176 and a second battery 178. Second battery 178 may provide redundancy should first battery 176 fail. First and second batteries 176, 178 are each configured to provide power (e.g., output current) to readiness indicator light assemblies 144a, 144 and non-indicator light assemblies 150. In various embodiments, initial readiness indicator light assembly 144a may be located closest to power supply 174. In this regard, initial readiness indicator light assembly 144a is upstream of the other readiness indicator light assemblies 144. As used herein, "upstream" refers to a direction opposite the direction of current flow through light system 140, such that current output from power supply 174 reaches an upstream component prior to a downstream component. In various embodiments, initial readiness indicator light assembly 144a may be upstream from the non-indicator light assemblies 150. In various embodiments, initial readiness indicator light assembly 144a may be downstream from the non-indicator light assemblies 150.

In various embodiments, the LEDs 160 of the readiness indicator light assemblies 144 that are downstream from initial readiness indicator light assembly 144a are electrically coupled to the output of first circuit 170. The LEDs 162 of the readiness indicator light assemblies 144 that are downstream from initial readiness indicator light assembly 144a are electrically coupled to the output of second circuit 172. In various embodiments, LEDs 164 of non-indicator light assemblies 150 are electrically coupled to first circuit 170. In various embodiments, LEDs 164 of non-indicator light assemblies 150 are electrically coupled to second circuit 172.

In accordance with various embodiments, prior to deployment of evacuation slide 110, first circuit 170 and second circuit 172 are both "open". In the open state, current is not provided to LEDs 160, 162 of initial readiness indicator light assembly 144a and/or to LEDs 160, 162 of downstream readiness indicator light assemblies 144 and/or to LEDs 164 of non-indicator light assemblies 150. In other words, LEDs 160, 162, 164 are off (i.e., not emitting light), when first circuit 170 and second circuit 172 are in the open state.

In various embodiments, a first plug 182 may be operationally coupled to first circuit 170. Prior to deployment of evacuation slide 110, first plug 182 may maintain first circuit 170 in the open state. First plug 182 may be connected to an actuator (e.g., a lanyard) 184. Actuator 184 may be configured to translate or "pull" first plug 182 in response to deployment of evacuation slide 110. For example, in various embodiments, actuator 184 may be coupled to exit door 104, such that a passenger opening exit door 104 causes actuator 184 to translate first plug 182. While actuator 184 is illustrated as connected (schematically) to exit door 104, it is contemplated and understood that actuator 184 may be connected to other components of evacuation assembly 106, for example, actuator 184 may be coupled to a packboard, a lever configured to deploy evacuation slide 110, to a portion of evacuation slide 110, or any other structure which may cause actuation of actuator 184 in response to initial deployment of evacuation slide 110.

In various embodiments, a second plug 186 may be operationally coupled to second circuit 172. Prior to evacuation slide 110 fully inflating, second plug 186 may maintain second circuit 172 in the open state. Second plug 186 may be connected to an actuator (e.g., a lanyard) 188. Actuator 188 may be configured to translate or "pull" second plug 186 in response to evacuation slide 110 fully deploying. For example, in various embodiments, actuator 188 may be coupled to toe end 116 of evacuation slide 110. In accordance with various embodiments, the pressure within evacuation slide 110 exceeding the desired minimum pressure may cause a translation of toe end 116, which is configured to cause actuator 188 to pull second plug 186, thereby allowing second circuit 172 to close. While actuator 188 is illustrated as connected (schematically) to toe end 116, it is contemplated and understood that actuator 188 may be connected to other components of evacuation assembly 106, for example, actuator 188 may be coupled to others portions of evacuation slide 110 or any other structure which may cause actuation of actuator 188 in response to pressure within evacuation slide 110 exceeding the desired minimum pressure.

With reference to FIG. 3B, after initial deployment of evacuation slide 110, first plug 182 is removed from first circuit 170, thereby causing first circuit 170 to close and allowing current to flow to LEDs 160 of readiness indicator light assemblies 144a, 144. In various embodiments, closing first circuit 170 allows current to flow to LEDs 164 of non-indicator light assemblies 150. In various embodiments, LEDs 160 emit red light, which may indicate to evacuees that evacuation slide 110 is not yet safe to use. During initial deployment (i.e., prior to evacuation slide 110 fully inflating), second plug 186 remains in second circuit 172, thereby preventing the flow of current to LEDs 162.

With reference to FIG. 3C, in response to the pressure within evacuation slide 110 exceeding the desired minimum pressure, second plug 186 is removed from second circuit 172, thereby causing second circuit 172 to close and allowing current to flow to LEDs 162 of readiness indicator light assemblies 144a, 144. In various embodiments, closing second circuit 172 allows current to flow to LEDs 164 of non-indicator light assemblies 150. In various embodiments, LEDs 162 emit green light, which may indicate to evacuees that evacuation slide 110 is now safe to use. Light system 140 is configured such that turning on LEDs 162 causes LEDs 160 to turn off. For example, first circuit 170 and/or second circuit 172 may be configured to stop the flow of current to LEDs 160 in response to second circuit 172 outputting current (i.e., in response to second circuit 172 closing). Light system 140 is configured such the LEDs 164 either begin outputting (if connected to second circuit 172) or continue outputting light (if connected to first circuit 170) after second circuit 172 is closed, thereby increasing a likelihood exit surface 124 will be illuminated when evacuees begin entering sliding surface 120.

Light system 140, including readiness indicator light assemblies 144, is configured to indicate a deployment status of the evacuation slide 110 (i.e., whether evacuation slide 110 is inflated sufficiently to safely evacuate passengers). Employing the evacuation slide's lighting system to indicate the slide's inflation status allows for a readiness indicator that is generally not affected by wind conditions and does not add additional components and/or weight to the evacuation assembly.

Figure 4A:
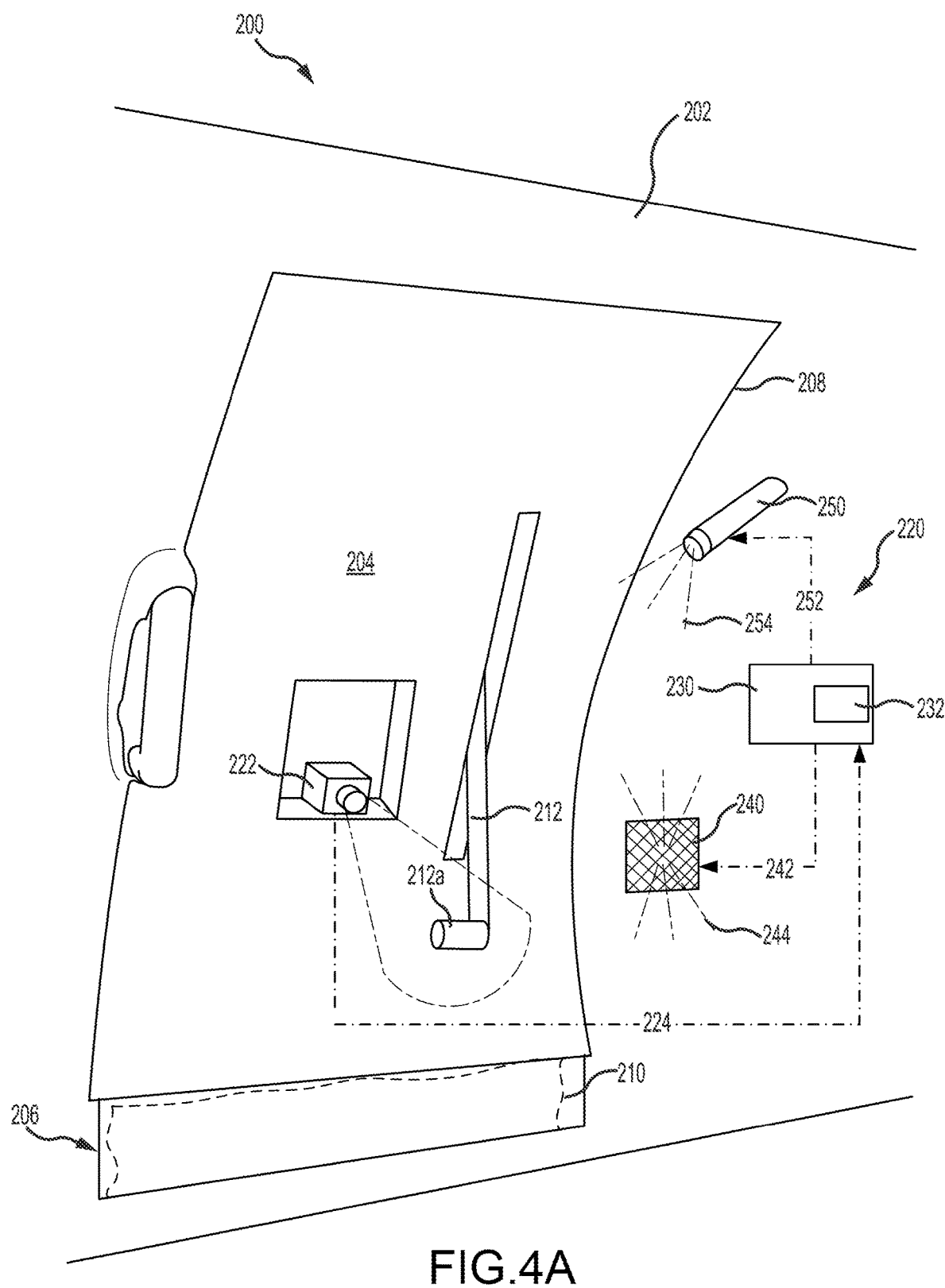
FIG. 4A illustrates a readiness indicator system located in the doorway of an aircraft with the door closed, in accordance with various embodiments.

Referring to FIG. 4A, an exemplary aircraft 200 is shown, in accordance with various embodiments. Aircraft 200 may be similar to aircraft 100 in FIG. 1. Aircraft 200 may comprise a fuselage 202 having plurality of exit doors, including an exit door 204. Exit door 204 is located in a doorway 208 defined by fuselage 202. Aircraft 200 may include one or more evacuation assemblies positioned near a corresponding exit door. For example, aircraft 200 includes an evacuation assembly 206 positioned near exit door 204. In the event of an emergency, exit door 204 may be opened by a passenger or crew member of aircraft 100. Evacuation assembly 206 may include an inflatable evacuation slide 210. In FIG. 4A, evacuation slide 210 is in a stowed, fully deflated position. Evacuation slide 210 may be similar to evacuation slide 110 in FIGS. 2A and 2B. In various embodiments, evacuation slide 210 may deploy in response to exit door 204 being opened or in response to another action taken by a passenger or crew member, such as the depression of a button, the actuation of a lever, or the like.

In accordance with various embodiments, door 204 may include a lever 212. Level 212 may be configured to, upon actuation, open door 204 and deploy evacuation assembly 206. In accordance with various embodiments, aircraft 200 may include an alert system 220. Alert system 220 may include an optical sensor 222. Optical sensor 222 may be oriented toward lever 212, for example, toward a handle 212a of lever 212. Optical sensor 220 may be configured to sense objects in the vicinity of handle 212a. Optical sensor 220 may be in operable communication with a controller 230 of alert system 200. For example, in response to detecting an objection in the vicinity of handle 212a, optical sensor 222 may output signals 224 to controller 230.

Controller 230 may include and communicate with one or more processor(s) and one or more tangible, non-transitory memories 232 and may be capable of implementing logic related to alert system 200. The processor can be a general purpose processor, a digital signal processor (DSP), an application specific integrated circuits (ASIC), a field programmable gate arrays (FPGAs) or other programmable logic device, discrete gates or transistor logic, discrete hardware component, or a combination thereof.

System program instructions and/or controller instructions may be loaded onto a tangible, non-transitory, computer-readable medium, such as tangible, non-transitory memory 232. The tangible, non-transitory, computer-readable medium having instructions stored thereon that, in response to execution by the controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Controller 230 may be in operable communication with a speaker 240 of alert system 200. Speaker 240 may be located proximate, or near, doorway 208. Controller 230 may be configured to output commands 242 to speaker 240. Speaker 240 may be configured to output an audio alert (e.g., beeps, a command, a warning, etc.) based on commands 242. In various embodiments, controller 230 may be in operable communication with a light 250 of alert system 200. Light 250 may be located proximate or near doorway 208. Controller 230 may be configured to output commands 252 to light 250. Light 250 may be configured to output a visual alert 254 (e.g., emit a flashing light, etc.) based on commands 252.

In response to receiving signal 224 from optical sensor 222, controller 230 may determine if an object is within one or more predetermined distance(s) from handle 212a. For example, controller 230 may be configured to determine if an object is within 50 centimeters (cm) (19.7 inches) of handle 212a or within 30 cm (11.8 inches) based on signal 224. Controller 230 may output command 242 and/or command 252 based on signal 224. For example, controller 230 may output command 252 in response to determining an object is within a first predetermined distance (e.g., within 50 cm (19.7 inches), within 40 cm (15.7 inches), etc.). Light 250 may output visual alert 254 (e.g., begin flashing) in response to receiving command 252. Controller 230 may output command 252 and command 242 in response to determining an object is within a second, shorter predetermined distance (e.g., within 30 cm (11.8 inches), within 20 cm (7.9 inches), etc.). Speaker 240 may output audio alert 244 (e.g., beep) in response to receiving command 242, and light 250 may output visual alert 254 (e.g., begin flashing) in response to receiving command 252.

Figure 4B:
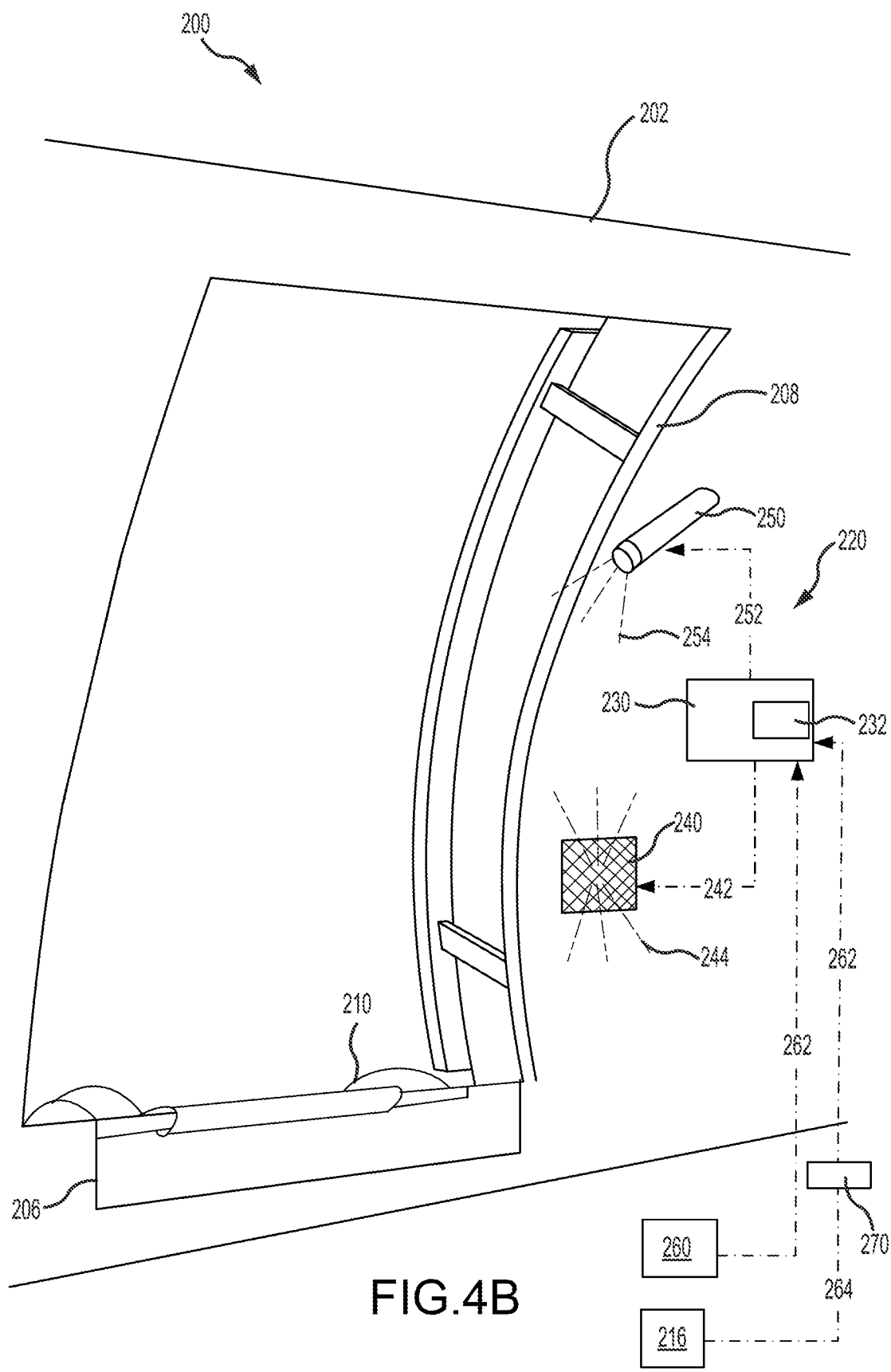
FIG. 4B illustrates a readiness indicator system located in the doorway of an aircraft with the door open, in accordance with various embodiments.

FIG. 4B illustrates evacuation slide 210 in a deployed position. Controller 230 may be configured to output commands 242 and/or commands 252 in response deployment of evacuation assembly 206. In accordance with various embodiments, controller 230 is configured to receive slide signals 262 corresponding to an inflation state of evacuation slide 210. In various embodiments, signals 262 may correspond to a position of a toe end 216 of evacuation slide 210 and/or an internal pressure of evacuation slide 210. In various embodiments, signals 262 may be sent from a pressure sensor 260 configured to measure the internal pressure of evacuation slide 210. In various embodiments, signals 262 may be generated by translation of a pin 270. For example, an actuator 264 (e.g., a lanyard) attached to the toe end 216 of evacuation slide 210 may be configured to translate or pull pin 270. Translation of pin 270 may cause signal 262 to be sent to controller 230.

Controller 230 may be configured to determine the inflation status of evacuation slide 210 and output commands 242 and/or commands 252 based on signals 262. For example, controller 230 may command light 250 to output visual alert 254 if the internal pressure of evacuation slide 210 is less than a predetermined minimum pressure. In various embodiments, controller 230 may be configured to command light 250 to output a visual alert 254 of a first color (e.g., red) if the internal pressure of evacuation slide 210 is less than a predetermined minimum pressure and command light 250 to output a visual alert 254 of a second color (e.g., green) if the internal pressure of evacuation slide 210 is greater than or equal to the predetermined minimum pressure. In various embodiments, controller 230 may command speaker 240 to output an audio alert 244 (e.g., a beep, or a "do not enter" command) if the internal pressure of evacuation slide 210 is less than a predetermined minimum pressure. In various embodiments, controller 230 may command speaker 240 to output an audio alert 244 comprising a first message indicating the slide should not be entered (e.g., a "do not enter" command) if the internal pressure of evacuation slide 210 is less than a predetermined minimum pressure and to output an audio alert 244 comprising a second message indicating the slide should be entered (e.g., a "go" command) if the internal pressure of evacuation slide 210 is greater than or equal to than the predetermined minimum pressure.

Alert system 220 may thus be configured to indicate a deployment status of the evacuation slide 210 (i.e., whether evacuation slide is inflated sufficiently to safely evacuate passengers). Employing the evacuation slide's door alert system allows for a readiness indicator that is generally not affected by wind conditions and does not add additional components and/or weight to the evacuation assembly.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation assembly, comprising:
   an evacuation slide;
   a lever configured to deploy the evacuation slide;
   an alert system comprising:
      a light located proximate a doorway of an aircraft;
      a speaker located proximate the doorway; and
      an optical sensor oriented toward the lever and configured to sense objects in a vicinity of the lever; and
   a controller operably coupled to the light, the speaker, and the optical sensor, wherein the controller is configured to:
   receive a first signal, from the optical sensor, corresponding to an object in the vicinity of the lever;
   receive a second signal, from a pressure sensor, corresponding to an inflation state of the evacuation slide; and
   output commands to the light and the speaker based on the first received from the optical sensor and based on the second signal received from the pressure sensor.

2. The evacuation assembly of claim 1, wherein the controller is further configured to:
   command the light to output a first color visual alert responsive to an internal pressure of the evacuation slide, as detected by the pressure sensor, being less than a predetermined minimum pressure; and
   command the light to output a second color visual alert responsive to the internal pressure of the evacuation slide, as detected by the pressure sensor, being greater than or equal to the predetermined minimum pressure.

3. The evacuation assembly of claim 2, wherein the controller is further configured to command the light to flash.

4. The evacuation assembly of claim 1, wherein the controller is further configured to:
   command the speaker to output a first audio alert comprising a first command responsive to an internal pressure of the evacuation slide, as detected by the pressure sensor, being less than a predetermined minimum pressure; and
   command the speaker to output a second audio alert comprising a second command different from the first command responsive to the internal pressure of the evacuation slide, as detected by the pressure sensor, being greater than or equal to the predetermined minimum pressure.

5. The evacuation assembly of claim 4, wherein the first audio alert includes one of a beep, a command, and a warning.

6. The evacuation assembly of claim 1, wherein the controller is further configured to output commands in response to determining the object is within a predetermined distance.

7. The evacuation assembly of claim 6, wherein the predetermined distance is about 50 cm.

8. The evacuation assembly of claim 6, wherein the predetermined distance is about 30 cm.

9. The evacuation assembly of claim 1, wherein the controller is further configured to indicate a deployment status of the evacuation slide, the deployment status indicating that the evacuation slide is inflated sufficiently to safely evacuate passengers.

* * * * *